US012603505B2

(12) United States Patent
Shu et al.

(10) Patent No.: US 12,603,505 B2
(45) Date of Patent: Apr. 14, 2026

(54) DYNAMIC FREQUENCY COORDINATION CONTROL METHOD FOR ASYNCHRONOUS REGIONAL POWER GRIDS DURING WET AND DRY SEASONS

(71) Applicant: Kunming University of Science and Technology, Kunming (CN)

(72) Inventors: Hongchun Shu, Kunming (CN); Zongxue Shao, Kunming (CN); Yutao Tang, Kunming (CN); Wei Zhao, Kunming (CN); Shunguang Lei, Kunming (CN); Guangxue Wang, Kunming (CN); Yinan Hu, Kunming (CN); Botao Shi, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 70 days.

(21) Appl. No.: 18/923,774

(22) Filed: Oct. 23, 2024

(65) Prior Publication Data

US 2026/0081428 A1 Mar. 19, 2026

(30) Foreign Application Priority Data

Sep. 14, 2024 (CN) .......................... 202411290493.7

(51) Int. Cl.
*H02J 3/36* (2026.01)
*H02J 3/1835* (2026.01)
*H02J 3/34* (2026.01)
*H02J 3/38* (2026.01)

(52) U.S. Cl.
CPC .............. *H02J 3/36* (2013.01); *H02J 3/1835* (2013.01); *H02J 3/34* (2013.01); *H02J 3/38* (2013.01)

(58) Field of Classification Search
CPC .... H02J 3/36; H02J 3/1835; H02J 3/34; H02J 3/38
See application file for complete search history.

(56) References Cited

U.S. PATENT DOCUMENTS

2018/0262009 A1* 9/2018 Sun .......................... H02J 3/08
2020/0348345 A1* 11/2020 Castro ................. H02J 3/00142
2023/0407841 A1* 12/2023 Wu ......................... F03D 7/028

* cited by examiner

*Primary Examiner* — Rexford N Barnie
*Assistant Examiner* — Thai H Tran
(74) *Attorney, Agent, or Firm* — Bayramoglu Law Offices LLC

(57) ABSTRACT

A dynamic frequency coordination control method for asynchronous regional power grids during wet and dry seasons is provided. By using frequency synchronous control in VSC-HVDC, frequency consistency and synchronization between the sending-end and receiving-end grids can be ensured within the range of power adjustment, enabling real-time and automatic sharing of frequency regulation resources between the two grids. Through the use of bilateral frequency limiting control in LCC-HVDC, the frequency regulation effect is enhanced, balancing frequency fluctuations between the sending-end and receiving-end grids. VSC-HVDC adaptive reactive power support control is employed to provide reactive power support to nearby LCC-HVDC, avoiding frequent operations of LCC-HVDC converter transformers and filters during frequency limiting control actions, thereby extending equipment lifespan. Furthermore, by utilizing grid-following and grid-forming control in renewable energy grid integration with additional frequency control, the frequency support capacity of renewable energy generation is improved.

17 Claims, 7 Drawing Sheets

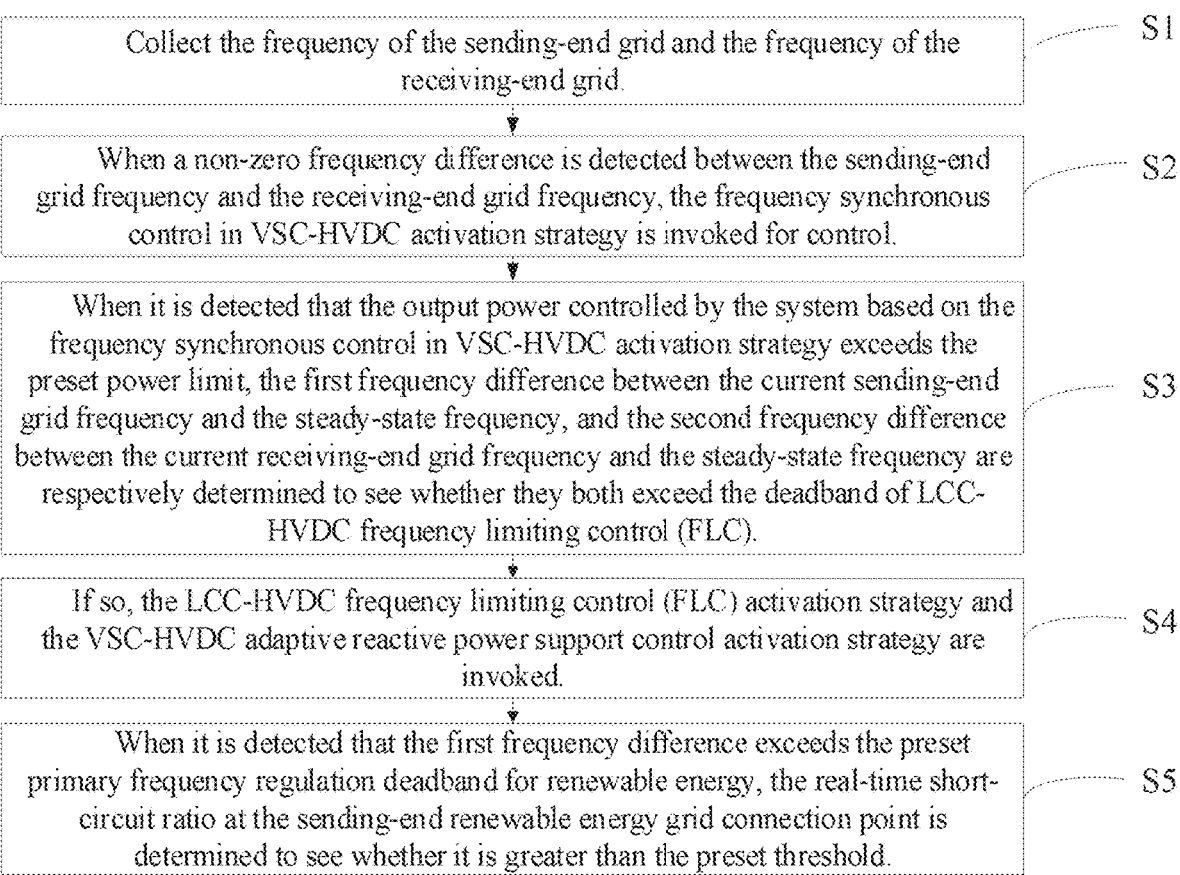

Collect the frequency of the sending-end grid and the frequency of the receiving-end grid. — S1

When a non-zero frequency difference is detected between the sending-end grid frequency and the receiving-end grid frequency, the frequency synchronous control in VSC-HVDC activation strategy is invoked for control. — S2

When it is detected that the output power controlled by the system based on the frequency synchronous control in VSC-HVDC activation strategy exceeds the preset power limit, the first frequency difference between the current sending-end grid frequency and the steady-state frequency, and the second frequency difference between the current receiving-end grid frequency and the steady-state frequency are respectively determined to see whether they both exceed the deadband of LCC-HVDC frequency limiting control (FLC). — S3

If so, the LCC-HVDC frequency limiting control (FLC) activation strategy and the VSC-HVDC adaptive reactive power support control activation strategy are invoked. — S4

When it is detected that the first frequency difference exceeds the preset primary frequency regulation deadband for renewable energy, the real-time short-circuit ratio at the sending-end renewable energy grid connection point is determined to see whether it is greater than the preset threshold. — S5

FIG. 2

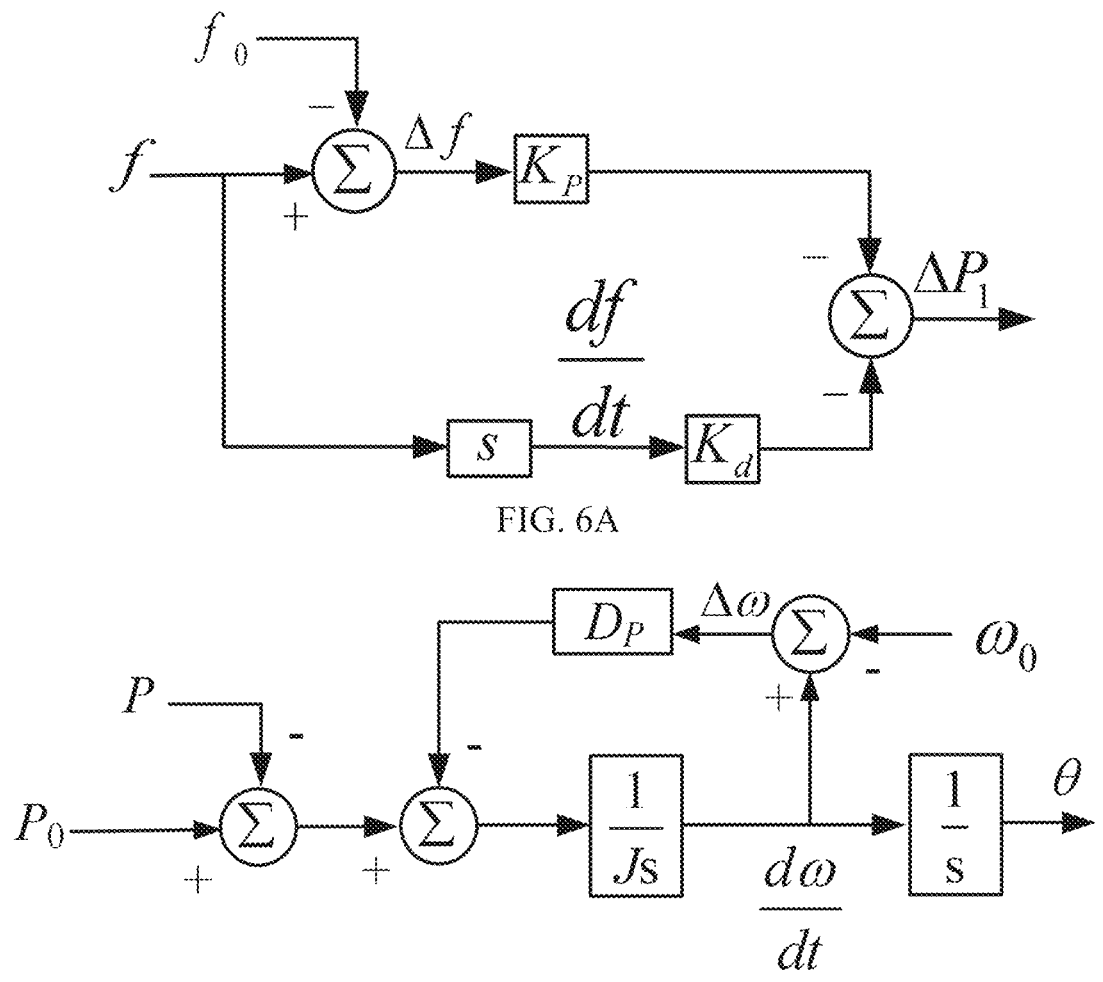
FIG. 6A
FIG. 6B
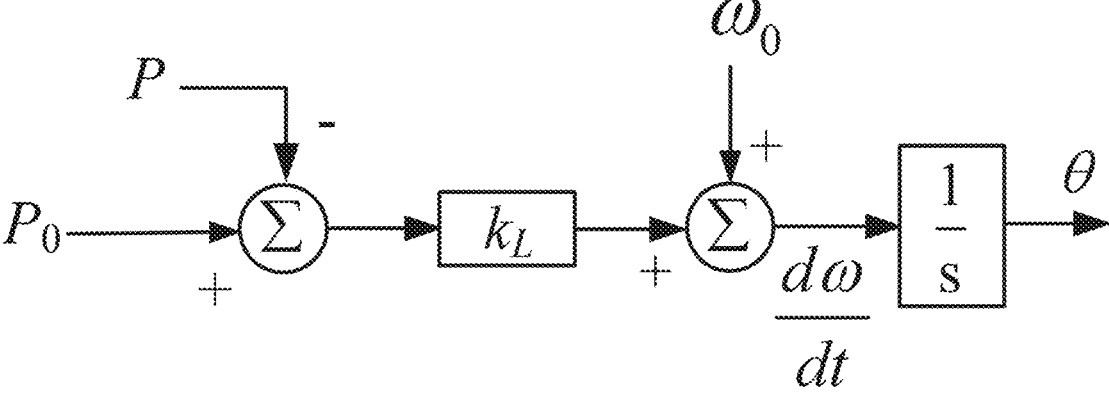
FIG. 6C

DYNAMIC FREQUENCY COORDINATION CONTROL METHOD FOR ASYNCHRONOUS REGIONAL POWER GRIDS DURING WET AND DRY SEASONS

CROSS REFERENCE TO THE RELATED APPLICATIONS

This application is based upon and claims priority to Chinese Patent Application No. 202411290493.7, filed on Sep. 14, 2024, the entire contents of which are incorporated herein by reference.

TECHNICAL FIELD

The present invention relates to the field of power system control technology, particularly to a dynamic frequency coordination control method for asynchronous regional power grids during wet and dry seasons.

BACKGROUND

Currently, the Yunnan Power Grid has achieved asynchronous interconnection with the Southern Power Grid. Asynchronous interconnection refers to the connection between AC systems operating at different frequencies, primarily realized through high voltage direct current (HVDC) transmission and converter stations. The use of asynchronous interconnection is mainly to address the stability issues caused by the transfer of a large amount of DC power due to DC blocking in AC-DC interconnected systems, which can lead to power angle stability problems.

However, after the Yunnan Power Grid and the Southern Power Grid achieved asynchronous operation, although it resolved the power angle stability issues caused by the "strong DC and weak AC" power transfer in the Southern Grid, it resulted in a significant reduction in the scale of the Yunnan Power Grid. This led to a substantial decrease in rotational inertia and load-side damping. Additionally, the inherent "water hammer effect" and negative damping phenomenon of hydropower units became more pronounced, highlighting the frequency stability and control issues of the Yunnan Power Grid, which is primarily hydropower-based. Moreover, the seasonal variations between the wet and dry periods in Yunnan have raised new requirements for the grid's generation and interconnection control.

Therefore, there is a need for a method that can coordinate dynamic frequency control for asynchronous regional power grids during the two different periods of wet and dry seasons. This method aims to enhance the frequency stability of the asynchronous regional power grid and enable real-time, automatic sharing of frequency regulation resources within the grid.

The above content is intended solely to assist in understanding the technical solution of the present invention and does not constitute an acknowledgment that the aforementioned content is prior art.

SUMMARY

The main objective of the present invention is to provide a dynamic frequency coordination control method for asynchronous regional power grids during wet and dry seasons, aimed at addressing the issue of how to improve the frequency stability of the asynchronous regional power grid.

To achieve the above objective, the present invention provides a dynamic frequency coordination control method for asynchronous regional power grids during wet and dry seasons, the method including:

S1, Collect the frequency of the sending-end grid and the frequency of the receiving-end grid.

S2, When a non-zero frequency difference is detected between the sending-end grid frequency and the receiving-end grid frequency, the frequency synchronous control in voltage source converter based high voltage direct current (VSC-HVDC) activation strategy is invoked for control.

S3, When it is detected that the output power controlled by the system based on the frequency synchronous control in VSC-HVDC activation strategy exceeds the preset power limit, the first frequency difference between the current sending-end grid frequency and the steady-state frequency, and the second frequency difference between the current receiving-end grid frequency and the steady-state frequency are respectively determined to see whether they both exceed the dead-band of line-commutated converter-based high-voltage direct current (LCC-HVDC) frequency limiting control (FLC).

S4, If so, the LCC-HVDC frequency limiting control (FLC) activation strategy and the VSC-HVDC adaptive reactive power support control activation strategy are invoked.

S5, When it is detected that the first frequency difference exceeds the preset primary frequency regulation dead-band for renewable energy, the real-time short-circuit ratio at the sending-end renewable energy grid connection point is determined to see whether it is greater than the preset threshold.

S6, If so, the grid-following additional frequency control strategy for the grid-connected renewable energy generation is activated; if not, the grid-forming control strategy for the grid-connected renewable energy generation is activated.

Optionally, after step S2, it further includes:

During the process in which the system is controlled based on the frequency synchronous control in VSC-HVDC activation strategy, it is determined whether the first frequency difference exceeds the preset primary frequency regulation dead-band for renewable energy, and whether the first frequency difference exceeds the preset primary frequency regulation dead-band for conventional units.

If so, the execution of S3 is allowed.

Otherwise, return to execute step S2.

Optionally, after step S4, it further includes:

During the process in which the system is controlled based on the LCC-HVDC frequency limiting control (FLC) activation strategy, it is determined whether the first frequency difference exceeds the preset primary frequency regulation dead-band for renewable energy, and whether the first frequency difference exceeds the preset primary frequency regulation dead-band for conventional units.

If so, the execution of S5 is allowed.

Otherwise, return to execute step S4.

Optionally, the system does not set a dead-band under the frequency synchronous control in VSC-HVDC activation strategy.

Optionally, the frequency synchronous control in VSC-HVDC activation strategy is configured with a first power regulation upper limit and a first power regulation lower limit, wherein the calculation formula for the first power regulation upper limit is:

$$\Delta P_{max} = k_1 P_{N1} - P_1$$

The calculation formula for the first power regulation lower limit is:

$$\Delta P_{min} = P_1 - m_1 P_{N1}$$

In the formula, $P_{N1}$ represents the rated power of the VSC-HVDC, $P_1$ represents the actual operating power of the VSC-HVDC, $k_1$ is the overload capacity coefficient of the VSC-HVDC, and $m_1$ is the minimum operating level coefficient of the VSC-HVDC power.

Optionally, the LCC-HVDC frequency limiting control (FLC) activation strategy includes a second power regulation upper limit and a second power regulation lower limit, wherein the calculation formula for the second power regulation upper limit is:

$$\Delta P_{up.max} = k_2 P_{N2} - P_2$$

The calculation formula for the second power regulation lower limit is:

$$\Delta P_{down.min} = P_2 - m_2 P_{N2}$$

In the formula, $P_{N2}$ represents the rated power of the LCC-HVDC, $P_2$ represents the actual operating power of the LCC-HVDC, $k_2$ is the overload capacity coefficient of the LCC-HVDC, and $m_2$ is the minimum operating level coefficient of the LCC-HVDC power.

Optionally, the VSC-HVDC adaptive reactive power support control activation strategy includes additional reactive power, and the calculation formula for the additional reactive power is:

$$\Delta Q = \Delta P \tan \varphi$$

In the formula, $\Delta P$ represents the power variation of the LCC-HVDC connected to the VSC-HVDC, and $\varphi$ represents the power factor on the valve side of the LCC-HVDC connected to the VSC-HVDC.

Optionally, the grid-following additional frequency control strategy for the grid-connected renewable energy generation includes additional frequency control, and the calculation formula for obtaining the additional power from the additional frequency control is:

$$\Delta P_1 = -k_d \frac{df}{dt} - k_p \Delta f$$

In the formula, $k_d$ represents the derivative coefficient, and $k_p$ represents the proportional coefficient.

Optionally, the grid-forming control strategy for the grid-connected renewable energy generation includes Droop Control and Virtual Synchronous Generator (VSG) Control, and the expression for the Droop Control is:

$$\frac{d\omega}{dt} = \frac{1}{Js}\left(D_p\left(\omega_0 - \frac{d\omega}{dt}\right)\right) + (P_0 - P)$$

The expression for the VSG control is:

$$\frac{d\omega}{dt} = \omega_0 + k_L(P_0 - P)$$

In the formula, J represents the virtual inertia coefficient, $D_p$ represents the virtual damping coefficient, $\omega$ is the actual angular frequency of the system, $\omega_0$ is the steady-state angular frequency of the system, $P_0$ is the steady-state active power of the system, P is the actual active power of the system, and $k_L$ is the droop coefficient.

In addition, to achieve the above objectives, the present invention also provides a power grid system, which includes: a memory, a processor, and an asynchronous regional power grid dynamic frequency coordination control program for wet and dry seasons stored in the memory and executable on the processor. When executed by the processor, the asynchronous regional power grid dynamic frequency coordination control program implements the steps of the dynamic frequency coordination control method for asynchronous regional power grids during wet and dry seasons as described above.

Compared to the prior art, the present invention has at least the following beneficial effects:

1. The present invention utilizes frequency synchronous control in VSC-HVDC to ensure frequency consistency and synchronization between the sending-end and receiving-end grids within the range of power adjustment, enabling real-time and automatic sharing of frequency regulation resources between the two grids.

2. The present invention employs bilateral LCC-HVDC frequency limiting control (FLC) to enhance the frequency regulation effect while addressing frequency fluctuations in both the sending-end and receiving-end grids.

3. The present invention utilizes VSC-HVDC adaptive reactive power support control to provide reactive power support to nearby LCC-HVDC, thereby avoiding frequent operations of the LCC-HVDC converter transformers and filters during FLC actions, which enhances the lifespan of the equipment.

4. By utilizing grid-following additional frequency control and grid-forming control for renewable energy generation, the present invention enhances the frequency support capability of renewable energy sources.

The present invention adopts different grid connection controls for renewable energy generation during wet and dry seasons. During the wet season, it employs grid-following additional frequency control, while during the dry season, it utilizes grid-forming control. This approach enhances the capacity for renewable energy consumption and improves frequency stability support capabilities.

BRIEF DESCRIPTION OF THE DRAWINGS

FIG. 2 is a flow diagram of the first embodiment of the dynamic frequency coordination control method for asynchronous regional power grids during wet and dry seasons in the present invention.

FIG. 6A is a block diagram of the grid-following additional frequency control for renewable energy generation related to the embodiment of the present invention.

FIG. 6B is a block diagram of the grid-forming VSG control for renewable energy generation related to the embodiment of the present invention.

FIG. 6C is a block diagram of the grid-forming droop control for renewable energy generation related to the embodiment of the present invention.

The realization, functional features, and advantages of the objectives of the present invention will be further explained in conjunction with the embodiments and with reference to the accompanying drawings.

DETAILED DESCRIPTION OF THE EMBODIMENTS

In order to better understand the above technical solutions, the following will provide a more detailed description of the exemplary embodiments of the present disclosure with reference to the accompanying drawings. Although the drawings show the exemplary embodiments of the present disclosure, it should be understood that various forms of implementation can be realized without being limited to the embodiments described herein. Instead, these embodiments are provided to enable a more thorough understanding of the present disclosure and to convey the full scope of the disclosure to those skilled in the art.

Figure 1:
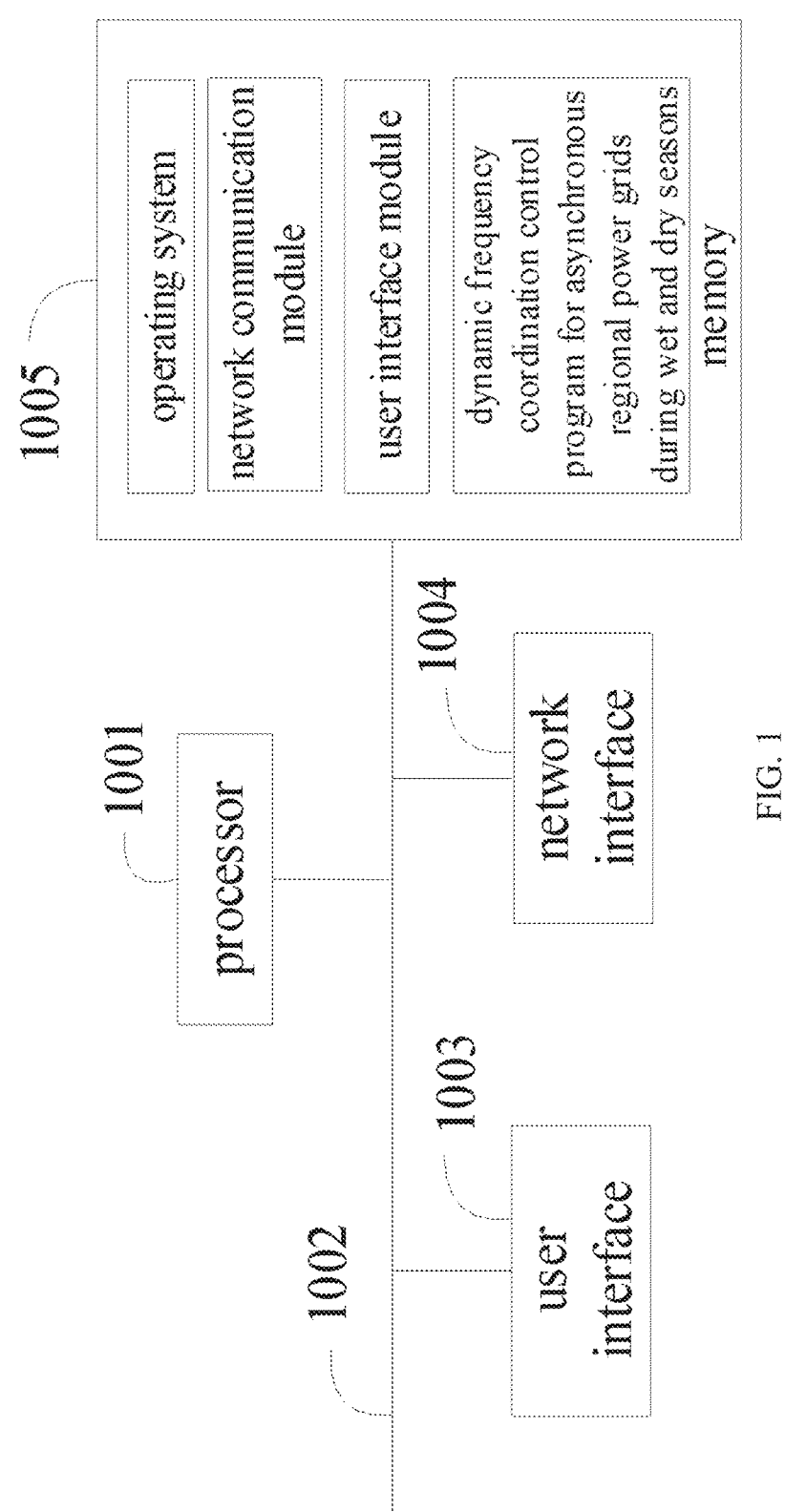
FIG. 1 is a schematic diagram of the hardware operating environment architecture of the power grid system related to the embodiment of the present invention.

As an implementation scheme, FIG. 1 is a schematic diagram of the hardware operating environment architecture of the power grid system related to the embodiment of the present invention.

As shown in FIG. 1, the power grid system may include: a processor 1001, such as a CPU; a memory 1005; a user interface 1003; a network interface 1004; and a communication bus 1002. The communication bus 1002 is used to facilitate communication and connection among these components. The user interface 1003 may include a display, an input unit such as a keyboard, and optionally, standard wired and wireless interfaces. The network interface 1004 may also include standard wired and wireless interfaces (e.g., Wi-Fi interfaces). The memory 1005 can be high-speed RAM or stable storage (non-volatile memory), such as disk storage. Optionally, the memory 1005 may also be a storage device independent of the aforementioned processor 1001.

Those skilled in the art will understand that the architecture of the power grid system shown in FIG. 1 does not constitute a limitation on the power grid system. It may include more or fewer components than illustrated, or combinations of certain components, or different arrangements of components.

As shown in FIG. 1, the memory 1005, as a storage medium, may include an operating system, a network communication module, a user interface module, and a dynamic frequency coordination control program for asynchronous regional power grids during wet and dry seasons. The operating system is the program that manages and controls the hardware and software resources of the power grid system, including the operation of the dynamic frequency coordination control program and other software or programs.

In the power grid system shown in FIG. 1, the user interface 1003 is primarily used to connect to terminals for data communication with those terminals; the network interface 1004 is mainly used for data communication with a backend server. The processor 1001 can be used to invoke the dynamic frequency coordination control program for asynchronous regional power grids during wet and dry seasons stored in the memory 1005.

In this embodiment, the power grid system includes: a memory 1005, a processor 1001, and a dynamic frequency coordination control program for asynchronous regional power grids during wet and dry seasons stored in the memory and executable on the processor, wherein:

When the processor 1001 invokes the dynamic frequency coordination control program for asynchronous regional power grids during wet and dry seasons stored in the memory 1005, it performs the following operations:

S1: Collect the frequency of the sending-end grid and the frequency of the receiving-end grid.

S2: When a non-zero frequency difference is detected between the sending-end grid frequency and the receiving-end grid frequency, invoke the frequency synchronous control in VSC-HVDC activation strategy for control.

S3: When it is detected that the output power controlled by the system based on the frequency synchronous control in VSC-HVDC activation strategy exceeds the preset power limit, determine whether the first frequency difference between the current sending-end grid frequency and the steady-state frequency, and the second frequency difference between the current receiving-end grid frequency and the steady-state frequency, are both greater than the dead-band of LCC-HVDC frequency limiting control (FLC).

S4: If so, invoke the LCC-HVDC frequency limiting control (FLC) activation strategy and the VSC-HVDC adaptive reactive power support control activation strategy.

S5: When it is detected that the first frequency difference exceeds the preset primary frequency regulation dead-band for renewable energy, determine whether the real-time short-circuit ratio at the sending-end renewable energy grid connection point is greater than the preset threshold.

S6: If so, invoke the grid-following additional frequency control strategy for the grid-connected renewable energy generation; if not, invoke the grid-forming control strategy for the grid-connected renewable energy generation.

When the processor 1001 invokes the dynamic frequency coordination control program for asynchronous regional power grids during wet and dry seasons stored in the memory 1005, it performs the following operations:

During the process in which the system is controlled based on the frequency synchronous control in VSC-HVDC activation strategy, it is determined whether the first frequency difference exceeds the preset primary frequency regulation dead-band for renewable energy, and whether the first frequency difference exceeds the preset primary frequency regulation dead-band for conventional units.

If so, the execution of S3 is allowed.

When the processor 1001 invokes the dynamic frequency coordination control program for asynchronous regional power grids during wet and dry seasons stored in the memory 1005, it performs the following operations:

During the process in which the system is controlled based on the LCC-HVDC frequency limiting control (FLC) activation strategy, it is determined whether the first frequency difference exceeds the preset primary frequency regulation dead-band for renewable energy, and whether the first frequency difference exceeds the preset primary frequency regulation dead-band for conventional units.

If so, the execution of S5 is allowed.

Otherwise, return to execute step S4.

Based on the hardware architecture of the power system control technology, an embodiment of the dynamic frequency coordination control method for asynchronous regional power grids during wet and dry seasons is proposed in the present invention.

First Embodiment

With reference to FIG. 2, in the first embodiment, the dynamic frequency coordination control method for asynchronous regional power grids during wet and dry seasons includes the following steps:

S1: Collect the frequency of the sending-end grid and the frequency of the receiving-end grid.

In this embodiment, the sending-end grid frequency refers to the frequency at the starting point of the power generation plant or transmission line in the power system; the receiving-end grid frequency refers to the frequency in the area where the load or electrical equipment is located. The receiving-end frequency is also part of the power system frequency but may have slight differences from the sending-end frequency due to various factors during the transmission process (such as load fluctuations, line impedance, etc.).

S2: When a non-zero frequency difference is detected between the sending-end grid frequency and the receiving-end grid frequency, invoke the frequency synchronous control in VSC-HVDC activation strategy for control.

In this embodiment, the system calculates the difference between the collected sending-end grid frequency and receiving-end grid frequency to obtain the frequency difference, and continuously monitors whether the frequency difference between the sending-end grid frequency and the receiving-end grid frequency is zero.

When a non-zero frequency difference is detected, the frequency synchronous control in VSC-HVDC activation strategy is invoked for control.

It should be noted that frequency synchronous control technology is one of the widely used technologies in modern power systems, where "synchronous control" refers to the control strategy that ensures the AC frequencies of the two sides of the grid (sending-end and receiving-end) remain consistent.

Optionally, the power system does not set a dead-band under the frequency synchronous control in VSC-HVDC activation strategy, which is primarily applied in back-to-back flexible DC systems.

Optionally, the frequency synchronous control in VSC-HVDC activation strategy is configured with a first power regulation upper limit and a first power regulation lower limit, wherein the calculation formula for the first power regulation upper limit is:

$$\Delta P_{max} = k_1 P_{N1} - P_1$$

The calculation formula for the first power regulation lower limit is:

$$\Delta P_{min} = P_1 - m_1 P_{N1}$$

In the formula, $P_{N1}$ represents the rated power of the VSC-HVDC, $P_1$ represents the actual operating power of the VSC-HVDC, $k_1$ is the overload capacity coefficient of the VSC-HVDC, and $m_1$ is the minimum operating level coefficient of the VSC-HVDC power.

In some specific implementations, the maximum value of $k_1$ is generally set at 1.05. However, as the capacity of the switching devices in the flexible DC converter increases, the maximum value of $k_1$ will continue to rise.

In some specific implementations, when the flexible DC converter uses a hybrid structure of full-bridge and half-bridge submodules, $m_1$ can be set to zero. When $m_1$ takes a value less than zero, the flexible DC experiences power flow reversal, and the value of $m_1$ is determined by specific operating conditions.

It should be noted that the frequency synchronous control does not require the setting of a frequency control dead-band, allowing for zero-error regulation.

It can be understood that if a zero frequency difference is detected between the sending-end grid frequency and the receiving-end grid frequency, the subsequent judgment steps will not be executed.

S3: When it is detected that the output power controlled by the system based on the frequency synchronous control in VSC-HVDC activation strategy exceeds the preset power limit, determine whether the first frequency difference between the current sending-end grid frequency and the steady-state frequency, as well as the second frequency difference between the current receiving-end grid frequency and the steady-state frequency, are both greater than the dead-band of the LCC-HVDC frequency limiting control (FLC).

S4: If so, invoke the LCC-HVDC frequency limiting control (FLC) activation strategy and the VSC-HVDC adaptive reactive power support control activation strategy.

In this embodiment, after the power grid system (hereinafter referred to as the "system") is controlled based on the previously invoked frequency synchronous control in VSC-HVDC activation strategy, it continuously retrieves the output power of the system under this strategy. When the output power exceeds the preset power limit, the difference between the current sending-end grid frequency and the steady-state frequency is calculated to obtain the first frequency difference, and the difference between the current receiving-end grid frequency and the steady-state frequency is calculated to obtain the second frequency difference. The system then determines whether the values of the first frequency difference and the second frequency difference are both greater than the dead-band of the LCC-HVDC frequency limiting control (FLC).

Optionally, the steady-state frequency is a predetermined fixed value.

Optionally, the dead-band of the LCC-HVDC frequency limiting control (FLC) can be set to ±0.14 Hz.

Next, in this embodiment, if it is determined that both frequency differences are greater than the dead-band of the LCC-HVDC frequency limiting control (FLC), meaning neither frequency difference falls within the dead-band, the LCC-HVDC frequency limiting control (FLC) activation strategy and the VSC-HVDC adaptive reactive power support control activation strategy are invoked to control the system.

The LCC-HVDC frequency limiting control (FLC) activation strategy refers to a direct current transmission system based on classic Voltage Source Converter (LCC-VSC) technology. Its control strategy includes Constant Voltage Control (CVC), which maintains a constant DC voltage at one end of the power grid system, and Constant Power Control (CPC), which controls the transmission power at the other end of the power grid system. By regulating the amount of active power transmitted to meet load demands, this approach ensures the stability of electrical energy transmission within the system.

The VSC-HVDC adaptive reactive power support control activation strategy includes Adaptive Reactive Power Control (ARPC), which allows for real-time adjustment of reactive power output in response to changes in grid load to maintain voltage stability in the power grid. Specifically, this is achieved by monitoring voltage fluctuations and load conditions in the grid, enabling the adaptive adjustment of the converter's reactive power injection or absorption. Under the adaptive reactive power support control strategy, the power grid system can quickly respond to voltage fluctuations or other anomalies by increasing reactive power injection to support voltage levels, thus preventing voltage collapse.

In this embodiment, the LCC-HVDC frequency limiting control (FLC) activation strategy includes unilateral FLC and bilateral FLC. The unilateral FLC is primarily applied in conventional DC systems with transmission line distances, while the bilateral FLC is mainly used in back-to-back conventional DC systems.

Optionally, the LCC-HVDC frequency limiting control (FLC) activation strategy is configured with a second power regulation upper limit $\Delta P_{up.max}$ and a second power regulation lower limit $\Delta P_{down.min}$, wherein the calculation formula for the second power regulation upper limit is:

$$\Delta P_{up.max} = k_2 P_{N2} - P_2$$

The calculation formula for the second power regulation lower limit is:

$$\Delta P_{down.min} = P_2 - m_2 P_{N2}$$

In the formula, $P_{N2}$ represents the rated power of the LCC-HVDC, $P_2$ represents the actual operating power of the LCC-HVDC, $k_2$ is the overload capacity coefficient of the LCC-HVDC, and $m_2$ is the minimum operating level coefficient of the LCC-HVDC power.

Optionally, in some specific implementations, when the system is continuously overloaded, the maximum value of $k_2$ is generally set at 1.1, while for short-term overload conditions, the maximum value of $k_2$ is typically set at 1.2.

Optionally, in some specific implementations, the value of m2 is set at 0.5.

In this embodiment, the VSC-HVDC adaptive reactive power support control is achieved by introducing additional reactive power control into the flexible DC reactive power control. Optionally, the adaptive reactive power support control strategy includes additional reactive power, and the calculation formula for the additional reactive power $\Delta Q$ is:

$$\Delta Q = \Delta P \tan \varphi$$

In the formula, $\Delta P$ represents the power variation of the LCC-HVDC connected to the VSC-HVDC, and $\varphi$ represents the power factor on the valve side of the LCC-HVDC connected to the VSC-HVDC.

It should be noted that the LCC-HVDC frequency limiting control (FLC) has a frequency control dead-band, which only allows for error-based regulation.

It can be understood that when neither the first frequency difference nor the second frequency difference is greater than the dead-band of the LCC-HVDC frequency limiting control (FLC), or in other scenarios, the subsequent steps will not be executed. Instead, the system will continue monitoring the frequency differences in the S4 step until both the first frequency difference and the second frequency difference exceed the dead-band of the LCC-HVDC frequency limiting control (FLC).

S5: When it is detected that the first frequency difference exceeds the preset primary frequency regulation dead-band for renewable energy, determine whether the real-time short-circuit ratio at the sending-end renewable energy grid connection point is greater than the preset threshold.

In this embodiment, after invoking the LCC-HVDC frequency limiting control (FLC) activation strategy and the VSC-HVDC adaptive reactive power support control activation strategy for system control, the system continuously monitors whether the first frequency difference between the current sending-end grid frequency and the steady-state frequency exceeds the preset primary frequency regulation dead-band for renewable energy. If it does exceed, the program to determine whether the real-time short-circuit ratio at the sending-end renewable energy grid connection point is greater than the preset threshold is executed.

Optionally, the preset primary frequency regulation dead-band for renewable energy refers to the range within which the actual frequency at the renewable energy grid connection point does not initiate primary frequency regulation when the difference from the steady-state frequency falls within the dead-band. This value can be set to 0.05 Hz.

In this embodiment, the real-time short-circuit ratio (Short Circuit Ratio, SCR) at the sending-end renewable energy grid connection point refers to the ratio of the system's short-circuit capacity to the generation capacity at the grid connection point. A high short-circuit ratio indicates that the grid is more robust and can more stably accommodate renewable energy; conversely, a low short-circuit ratio suggests that the grid is more vulnerable and more sensitive to voltage fluctuations and other disturbances.

Optionally, the preset threshold is set to 3, meaning that the system will determine whether the SCR is greater than 3.

S6: If so, invoke the grid-following additional frequency control strategy for the grid-connected renewable energy generation; if not, invoke the grid-forming control strategy for the grid-connected renewable energy generation.

In this embodiment, when it is determined that the real-time short-circuit ratio at the sending-end renewable energy grid connection point is greater than the preset threshold, it indicates that the grid is operating in an environment corresponding to the wet season. The grid-following additional frequency control strategy for renewable energy generation is then invoked for grid control. Conversely, when the real-time short-circuit ratio is found to be less than the preset threshold, it indicates that the grid is in an environment corresponding to the dry season, and the grid-forming control strategy for renewable energy generation is invoked for grid control.

The grid-following additional frequency control strategy for renewable energy generation refers to the method employed in integrating renewable energy sources (such as wind and solar power) into the grid. Since renewable energy generation typically connects to the grid through power electronic devices (such as inverters), these devices do not possess physical inertia in the traditional sense and therefore cannot naturally respond to changes in grid frequency. As a result, specific grid-following control (Grid-Following Control, GFC) and additional frequency control strategies are implemented to address this limitation.

Grid-following control refers to the operation of inverters when connected to the grid, where they follow the voltage and frequency signals of the grid. The inverters do not actively regulate the frequency; instead, they operate based on the grid's frequency. The inverter control system continuously monitors the voltage and frequency of the grid and adjusts its output power to synchronize with the grid.

The additional frequency control strategy is designed to provide frequency support within the grid-following control framework and includes the following types of control:

(1) Virtual Inertia Control: This involves controlling the output power of the inverter to simulate the inertial response of traditional synchronous generators. Virtual inertia control allows the inverter to temporarily increase or decrease power output when frequency changes occur, thereby mitigating frequency fluctuations.

(2) Primary Frequency Regulation: When a frequency deviation occurs, the inverter automatically adjusts its output power based on a predefined frequency-power curve. It increases active power output when the frequency is below the rated value and decreases active power output when the frequency is above the rated value.

(3) Secondary Frequency Regulation: This aims to restore the system frequency to its rated value. The inverter coordinates with the grid through a communication system, receiving Automatic Generation Control (AGC) commands to make power adjustments.

Optionally, in this embodiment, the grid-following control for renewable energy generation achieves frequency support functionality through additional frequency control. The grid-following additional frequency control strategy includes additional frequency control, and the calculation formula for the additional power obtained from this additional frequency control is:

$$\Delta P_1 = -k_d \frac{df}{dt} - k_p \Delta f$$

In the formula, $k_d$ represents the derivative coefficient, and $k_p$ represents the proportional coefficient.

The grid-forming control strategy for renewable energy generation is an advanced inverter control strategy developed to ensure the stability and reliability of the power grid, particularly in scenarios with a high proportion of renewable energy integration. Unlike grid-following control, the inverters in grid-forming control not only follow the grid's voltage and frequency but also actively create and maintain the voltage and frequency of the grid. This makes grid-forming control suitable for weak grids, islanding operation modes, or microgrids, and it is an important component of future power systems with a high proportion of renewable energy. Grid-forming inverters actively generate and maintain a stable AC voltage source through internal control algorithms, similar to traditional synchronous generators. This means that, regardless of the presence of a grid, grid-forming inverters can set and output a constant voltage and frequency. Additionally, grid-forming inverters can actively adjust their output voltage magnitude and frequency, thereby providing voltage regulation and frequency support to the grid.

Optionally, in this embodiment, the grid-forming control for renewable energy generation itself has frequency support functionality, which includes droop control and Virtual Synchronous Generator (VSG) control. The expression for the droop control is:

$$\frac{d\omega}{dt} = \frac{1}{Js}\left(D_p\left(\omega_0 - \frac{d\omega}{dt}\right)\right) + (P_0 - P)$$

The expression for the VSG control is:

$$\frac{d\omega}{dt} = \omega_0 + k_L(P_0 - P)$$

In the formula, J represents the virtual inertia coefficient, $D_p$ represents the virtual damping coefficient, $\omega$ is the actual angular frequency of the system, $\omega_0$ is the rated angular frequency of the system, $P_0$ is the steady-state active power of the system, P is the actual active power of the system, and $k_L$ is the droop coefficient.

It should be noted that during the wet season (i.e., when the SCR is greater than 3), the principle of using the grid-following additional frequency control strategy involves adding additional frequency control to the outer loop of the grid-following control. This strategy is categorized as current source-based and is suitable for stronger grid connection scenarios. Its advantage lies in being able to operate in maximum power output mode when renewable energy is running stably, while still providing some frequency support capability during frequency disturbances. In contrast, during the dry season (i.e., when the SCR is less than 3), the principle of using grid-forming control mimics the power synchronization control function of synchronous generators. This strategy is categorized as voltage source-based and is suitable for weaker grid connection scenarios, where it can actively provide frequency and voltage support. The strength of the grid connection is represented by the short-circuit ratio (SCR) at the connection point.

In the technical solution provided by this embodiment, different control strategies are employed to manage the grid during various frequency fluctuations. This ensures that when frequency fluctuations occur in the sending and receiving systems, renewable energy generation, conventional power generation, and DC transmission can flexibly, rapidly, and accurately coordinate to participate in primary frequency regulation of the grid. This approach quickly suppresses frequency fluctuations, enhancing the safety of electrical equipment and improving the stable operation of the power grid.

Second Embodiment

As an optional embodiment, in this implementation, after step S2, it further includes:

S7: During the process in which the system is controlled based on the frequency synchronous control in VSC-HVDC activation strategy, determine whether the first frequency difference exceeds the preset primary frequency regulation dead-band for renewable energy, and whether the first frequency difference exceeds the preset primary frequency regulation dead-band for conventional units.

S8: If so, the execution of S3 is allowed.

S9: Otherwise, return to execute step S2.

In this embodiment, during the process of controlling the system based on the frequency synchronous control in VSC-HVDC activation strategy, the system continuously monitors whether the first frequency difference between the current sending-end grid frequency and the steady-state frequency simultaneously exceeds both the preset primary frequency regulation dead-band for renewable energy and the primary frequency regulation dead-band for conventional units.

If both dead-bands are simultaneously exceeded, the specific actions in step S3 are allowed to be executed. Otherwise, the system continues to maintain control based on the frequency synchronous control in VSC-HVDC activation strategy.

It should be noted that bilateral frequency limiting control (FLC) needs to account for frequency regulation on both the sending and receiving ends.

Third Embodiment

As an optional embodiment, in this implementation, after step S4, it further includes:

S10: During the process in which the system is controlled based on the LCC-HVDC frequency limiting control (FLC) activation strategy, determine whether the first frequency difference exceeds the preset primary frequency regulation dead-band for renewable energy, and whether the first frequency difference exceeds the preset primary frequency regulation dead-band for conventional units.

S11: If so, the execution of S5 is allowed.

S12: Otherwise, return to execute step S4.

In this embodiment, during the process where the system invokes the LCC-HVDC frequency limiting control (FLC) activation strategy and the VSC-HVDC adaptive reactive power support control activation strategy, it continuously monitors whether the first frequency difference between the current sending-end grid frequency and the steady-state frequency simultaneously exceeds the preset primary frequency regulation dead-band for renewable energy and the primary frequency regulation dead-band for conventional units.

If both dead-bands are simultaneously exceeded, the specific actions in step S5 are allowed to be executed. Otherwise, the system continues to maintain control based on the LCC-HVDC frequency limiting control (FLC) activation strategy and the VSC-HVDC adaptive reactive power support control activation strategy.

It should be noted that both the primary frequency regulation for renewable energy and the primary frequency regulation for hydropower are configured with a frequency regulation dead-band, with a value of 0.05 Hz.

Figure 3:
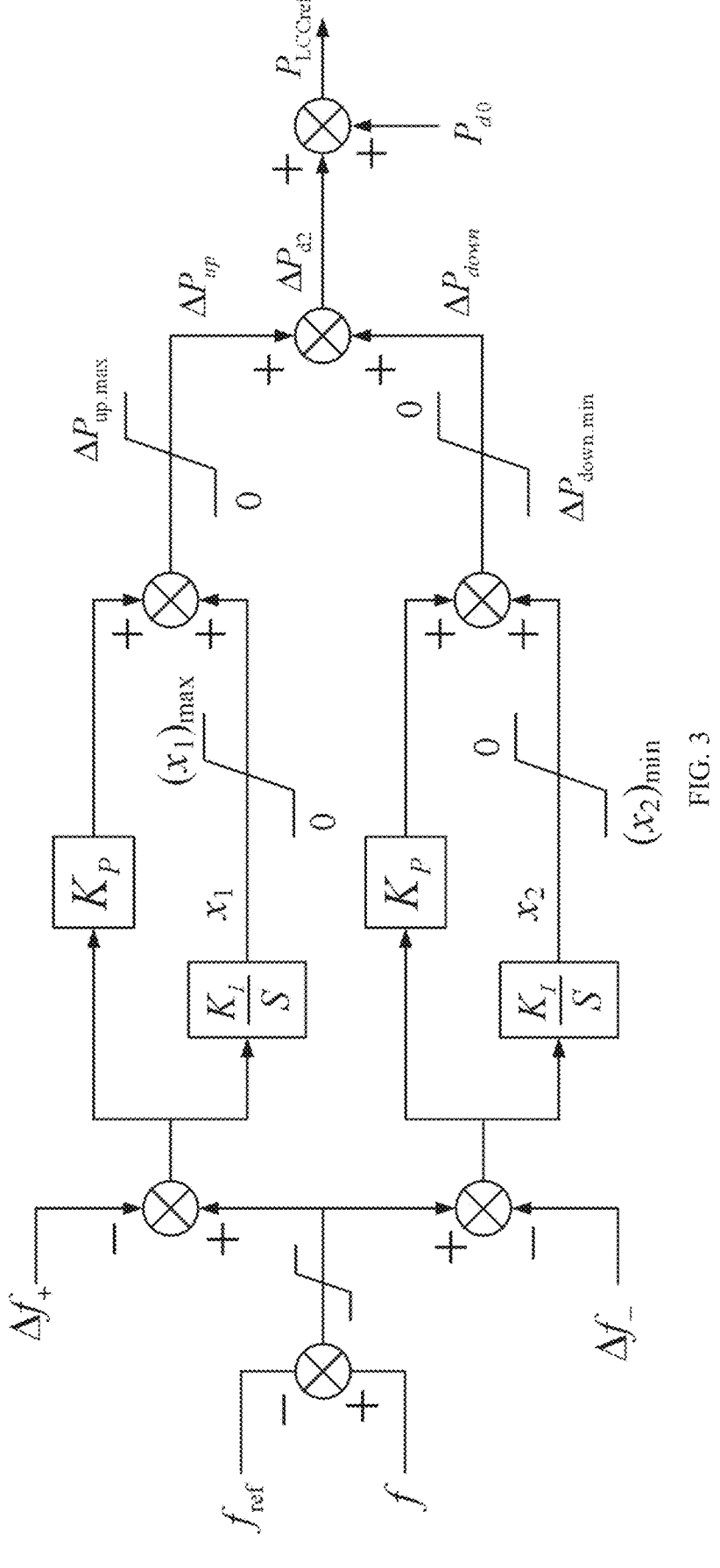
FIG. 3 is a block diagram of the frequency synchronous control in VSC-HVDC related to the embodiment of the present invention.

In addition, as an implementation scheme, as shown in the block diagram of frequency synchronous control in VSC-HVDC in FIG. 3, the inputs for the frequency synchronous control are the difference between the sending-end grid frequency $f_R$ and the system frequency reference $f_{ref}$ and the difference between the receiving-end grid frequency $f_I$ and the system frequency reference $f_{ref}$. These inputs are processed through control stages such as filtering, DC blocking, limiting, and PI control to output the VSC power adjustment $\Delta P_{d1}$. The VSC power adjustment $\Delta P_{d1}$ is added to the original VSC power command $P_{VSC}$ to generate a new VSC power command $P_{VSCref}$ thereby achieving automatic adjustment of the VSC power magnitude and direction, resulting in active frequency regulation.

Figure 4A:
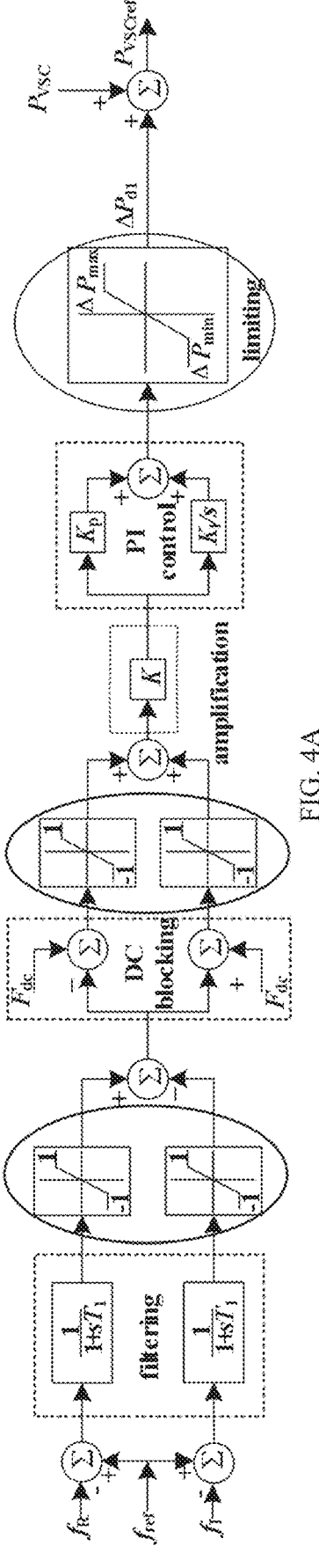
FIG. 4A is a block diagram of the LCC-HVDC unilateral frequency limiting control (FLC) related to the embodiment of the present invention.

In addition, as an implementation scheme, as shown in the block diagram of the unilateral LCC-HVDC frequency limiting control (FLC) in FIG. 4A, the input for the unilateral LCC-HVDC FLC is the difference between the sending-end grid frequency $f_R$ and the system frequency reference $f_{ref}$. This input is processed through control stages such as PI control and limiting to output the LCC-HVDC power adjustment $\Delta P_{d2}$. The LCC-HVDC power adjustment $\Delta P_{d2}$ is added to the original LCC-HVDC power command $P_{d0}$ to generate a new LCC-HVDC power command $P_{LCCref}$ thereby achieving automatic adjustment of the LCC-HVDC power magnitude and direction, resulting in active frequency regulation.

Figure 4B:
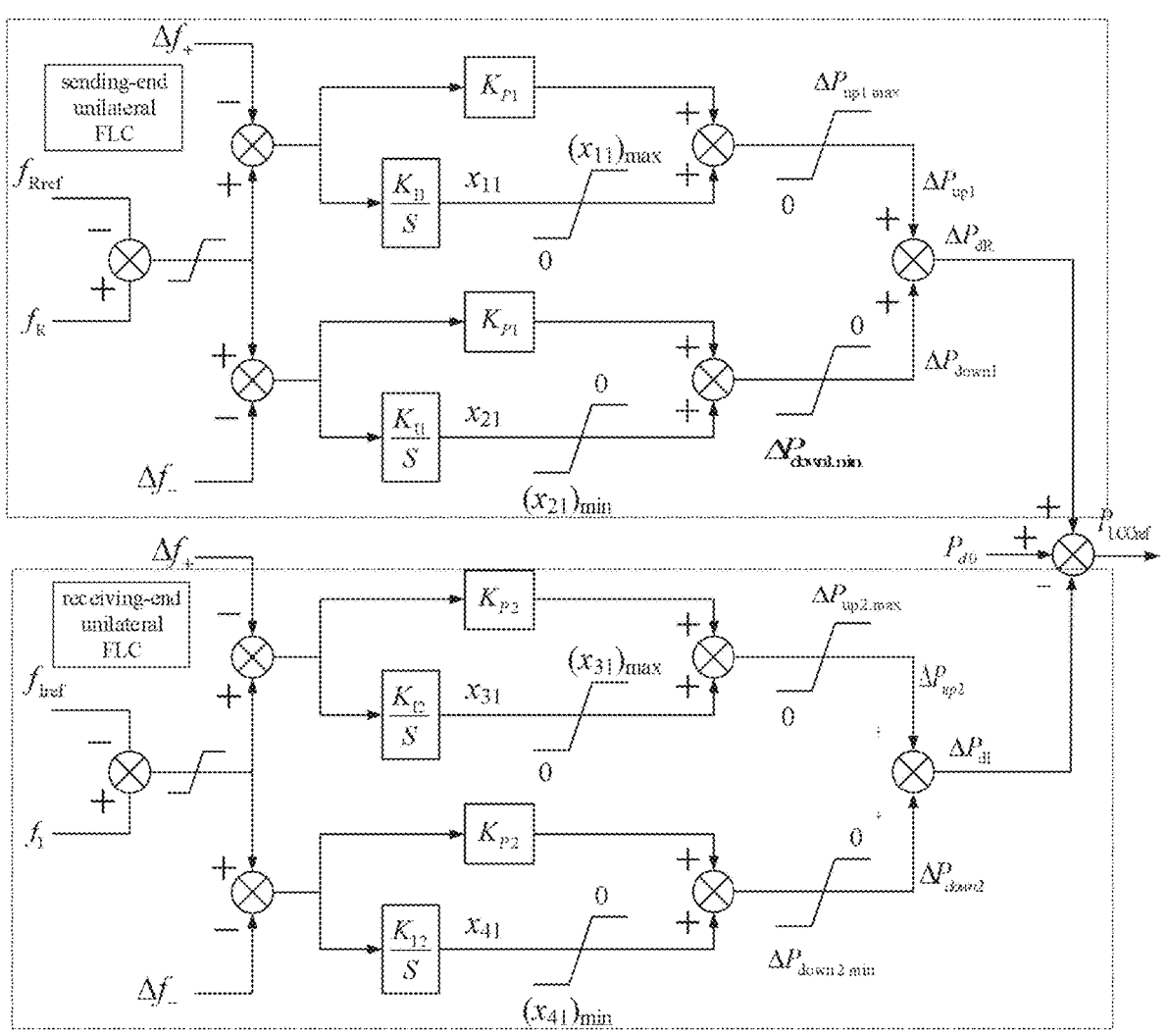
FIG. 4B is a block diagram of the bilateral LCC-HVDC frequency limiting control (FLC) related to the embodiment of the present invention.

As shown in the block diagram of the bilateral LCC-HVDC frequency limiting control (FLC) in FIG. 4B, the bilateral LCC-HVDC FLC is composed of two unilateral FLCs, one for the sending end and one for the receiving end. The input for the sending-end unilateral FLC is the difference between the sending-end grid frequency $f_R$ and the system frequency reference $f_{ref}$ while the input for the receiving-end unilateral FLC is the difference between the receiving-end grid frequency $f_I$ and the system frequency reference $f_{ref}$. These inputs are processed through control stages such as PI control and limiting to output the LCC-HVDC power adjustments $\Delta P_{dR}$ and $\Delta P_{dI}$. The difference between $\Delta P_{dR}$ and $\Delta P_{dI}$ is then calculated, and added to the original LCC-HVDC power command $P_{d0}$ generating a new LCC-HVDC power command $P_{LCCref}$. This allows for automatic adjustment of the LCC-HVDC power magnitude and direction, resulting in active frequency regulation.

Figure 5:
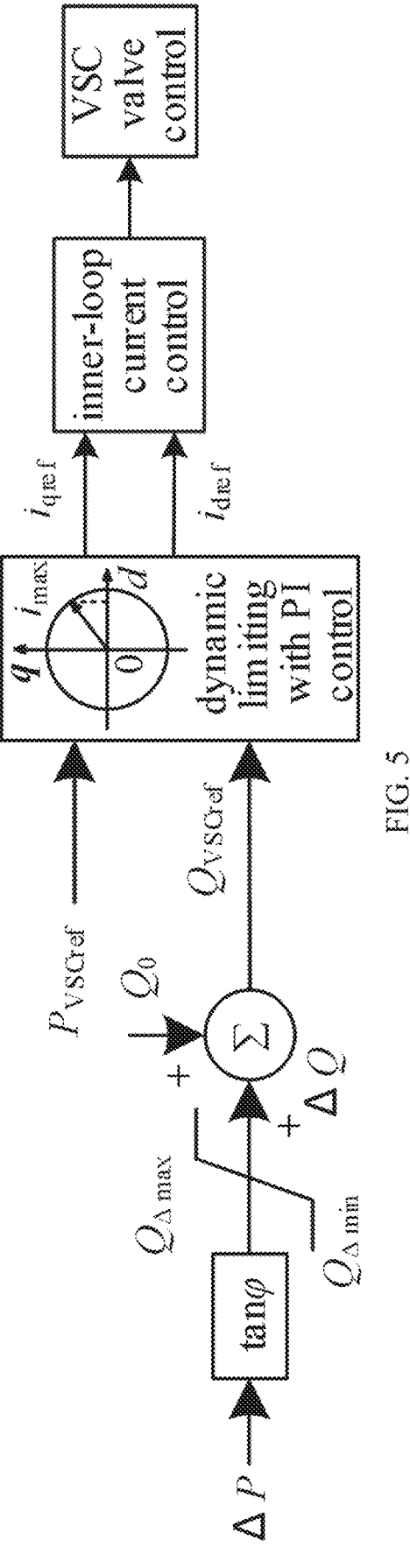
FIG. 5 is a block diagram of the VSC-HVDC adaptive reactive power support control related to the embodiment of the present invention.

In addition, as an implementation scheme, as shown in the block diagram of VSC-HVDC adaptive reactive power support control in FIG. 5, the input for adaptive reactive power support control is the power adjustment $\Delta P$ of the LCC-HVDC. The required reactive power compensation $\Delta Q$ for the LCC-HVDC is calculated based on the power factor. This reactive power compensation $\Delta Q$ is added to the original reactive power command $Q_0$ of the VSC-HVDC, generating a new reactive power command. Through a dynamic limiting stage with PI control, the reactive current reference $i_{qref}$ needed for the inner-loop current control is generated. The active current reference $i_{qref}$ required for the inner-loop current control is generated from the active power command $P_{VSCref}$ through a dynamic limiting stage with PI control. Finally, the VSC valve control adjusts the output of active and reactive power in the VSC-HVDC system.

In addition, as an implementation scheme, as shown in the block diagram of grid-following additional frequency control for renewable energy generation in FIG. 6A, the input for the grid-following additional frequency control is the difference between the actual measured frequency at the renewable energy grid connection point and the frequency reference value. This difference is processed through a proportional-derivative (PD) control stage to generate the grid-following control additional power adjustment $\Delta P_1$.

As shown in the block diagram of grid-forming VSG control for renewable energy generation in FIG. 6B, the input for the grid-forming VSG control is the difference between the actual measured power at the renewable energy grid connection point and the power reference value. This difference is processed through virtual inertia, virtual damping stages, and an integration stage to generate the phase angle θ required for grid-forming control. The introduction of virtual inertia and virtual damping enhances the grid-forming control's ability to provide strong frequency support.

As shown in the block diagram of grid-forming droop control for renewable energy generation in FIG. 6C, the input for the grid-forming droop control is the difference between the actual measured power at the renewable energy grid connection point and the power reference value. This difference is processed through a droop coefficient and integration stage to generate the phase angle θ required for grid-forming control, providing the grid-forming control with strong frequency support capabilities.

In addition, it is understood by those skilled in the art that all or part of the processes in the methods of the above embodiments can be executed by instructing the relevant hardware through a computer program. This computer program includes program instructions that can be stored on a storage medium, which is a computer-readable storage medium. The program instructions are executed by at least one processor in the power grid system to perform the process steps of the methods in the above embodiments.

Therefore, the present invention also provides a computer-readable storage medium, which stores a dynamic frequency coordination control program for asynchronous regional power grids during wet and dry seasons. When executed by a processor, this program implements the steps of the dynamic frequency coordination control method for asynchronous regional power grids during wet and dry seasons as described in the above embodiments.

The computer-readable storage medium may be a USB flash drive, portable hard disk, Read-Only Memory (ROM), magnetic disk, optical disc, or other various types of computer-readable storage media capable of storing program code.

It should be noted that since the storage medium provided by this application's embodiments is used to implement the methods described in these embodiments, those skilled in the art can understand the specific structure and variations of the storage medium based on the methods described herein. Therefore, further elaboration is unnecessary. Any storage medium used to implement the methods in this application's embodiments falls within the scope of the protection sought by this application.

Those skilled in the art will understand that the embodiments of the present invention can be provided as a method, system, or computer program product. Therefore, the present invention can take the form of a purely hardware embodiment, a purely software embodiment, or an embodiment combining both software and hardware. Furthermore, the present invention can take the form of a computer program product implemented on one or more computer-readable storage media that contain computer-usable program code (including but not limited to disk storage, CD-ROM, optical storage, and the like).

The present invention is described with reference to flowcharts and/or block diagrams of methods, devices (systems), and computer program products according to embodiments of the present invention. It should be understood that each flow and/or block in the flowcharts and/or block diagrams, as well as the combinations of flows and/or blocks in the flowcharts and/or block diagrams, can be implemented by computer program instructions. These computer program instructions may be provided to a processor of a general-purpose computer, a specialized computer, an embedded processor, or other programmable data processing devices to create a machine that executes the instructions via the computer or other programmable data processing device's processor to implement the functions specified in one or more flows of the flowchart or blocks of the block diagram.

These computer program instructions may also be stored in a computer-readable storage medium that can direct a computer or other programmable data processing devices to function in a specific manner, such that the instructions stored in the computer-readable storage medium create an article of manufacture that includes instruction means for implementing the functions specified in one or more flows of the flowchart and/or one or more blocks of the block diagram.

These computer program instructions can also be loaded onto a computer or other programmable data processing devices, causing the execution of a series of operational steps on the computer or other programmable devices to produce computer-implemented processing. Thus, the instructions executed on the computer or other programmable devices provide steps for implementing the functions specified in one or more flows of the flowchart and/or one or more blocks of the block diagram.

It should be noted that in the claims, any reference signs placed between parentheses should not be construed as limiting the claims. The word "including" does not exclude the presence of components or steps that are not listed in the claims. The use of the term "a" or "an" preceding a component does not exclude the presence of multiple such components. The invention may be implemented by means of hardware that includes several different components or by means of a suitably programmed computer. In a claim that lists several devices, several of these devices may be embodied by the same hardware item. The use of terms such as first, second, and third does not indicate any particular order; these terms should be interpreted as names.

Although preferred embodiments of the present invention have been described, once the fundamental inventive concept is known, those skilled in the art may make further changes and modifications to these embodiments. Therefore, the appended claims are intended to be construed as including the preferred embodiments as well as all changes and modifications that fall within the scope of the present invention.

It is evident that those skilled in the art may make various modifications and alterations to the present invention without departing from its spirit and scope. Therefore, if such modifications and alterations fall within the scope of the claims of the present invention and their equivalents, the present invention is also intended to encompass these modifications and alterations.

What is claimed is:

1. A dynamic frequency coordination control method for asynchronous regional power grids during wet and dry seasons, comprising the following steps:

S1, collecting a frequency of a sending-end grid and a frequency of a receiving-end grid;

S2, when a non-zero frequency difference is detected between the frequency of the sending-end grid and the frequency of the receiving-end grid, activating a frequency synchronous control in a voltage source converter based high voltage direct current (VSC-HVDC) for control;

S3, when an output power controlled by a system based on the frequency synchronous control in a VSC-HVDC activation strategy is detected to exceed a preset power limit, determining a first frequency difference between a current sending-end grid frequency and a steady-state frequency, and a second frequency difference between a current receiving-end grid frequency and the steady-state frequency respectively to see whether the first frequency difference and the second frequency difference both exceed a dead-band of a line-commutated converter-based high-voltage direct current (LCC-HVDC) frequency limiting control (FLC);

S4, when the first frequency difference and the second frequency difference both exceed the dead-band of the LCC-HVDC FLC calling an LCC-HVDC FLC activation strategy and a VSC-HVDC adaptive reactive power support control activation strategy for control;

S5, when the first frequency difference is detected to exceed a preset primary frequency regulation dead-band of a renewable energy, determining a real-time short-circuit ratio at a sending-end renewable energy grid connection point to see whether the real-time short-circuit ratio is greater than a preset threshold;

S6, when the real-time short-circuit ratio is greater than the preset threshold, activating a grid-following additional frequency control strategy for a grid-connected renewable energy generation; when the real-time short-circuit ratio is less than or equal to the preset threshold, activating a grid-forming control strategy for the grid-connected renewable energy generation.

2. The dynamic frequency coordination control method according to claim 1, wherein after the step S2, the dynamic frequency coordination control method further comprises:

when the system is controlled based on the frequency synchronous control in the VSC-HVDC activation strategy, determining whether the first frequency difference exceeds the preset primary frequency regulation dead-band of the renewable energy, and whether the first frequency difference exceeds preset primary frequency regulation dead-band of conventional units;

when the first frequency difference exceeds the preset primary frequency regulation dead-band of the renewable energy and the preset primary frequency regulation dead-band of the conventional units, an execution of the step S3 is allowed;

when the first frequency difference does not exceed the preset primary frequency regulation dead-band of the renewable energy and the preset primary frequency regulation dead-band of the conventional units, return to execute the step S2.

3. The dynamic frequency coordination control method according to claim 1, wherein after the step S4, the dynamic frequency coordination control method further comprises:

when the system is controlled based on the LCC-HVDC FLC activation strategy, determining whether the first frequency difference exceeds the preset primary frequency regulation dead-band of the renewable energy, and whether the first frequency difference exceeds preset primary frequency regulation dead-band of conventional units;

when the first frequency difference exceeds the preset primary frequency regulation dead-band of the renewable energy and the preset primary frequency regulation dead-band of the conventional units, an execution of the step S5 is allowed;

when the first frequency difference does not exceed the preset primary frequency regulation dead-band of the renewable energy and the preset primary frequency regulation dead-band of the conventional units, return to execute the step S4.

4. The dynamic frequency coordination control method according to claim 1, wherein no dead-band is set for the system under the frequency synchronous control in the VSC-HVDC activation strategy.

5. The dynamic frequency coordination control method according to claim 1, wherein the frequency synchronous control in the VSC-HVDC activation strategy is configured with a first power regulation upper limit and a first power regulation lower limit, wherein a calculation formula for the first power regulation upper limit is:

$$\Delta P_{max} = k_1 P_{N1} - P_1$$

a calculation formula for the first power regulation lower limit is:

$$\Delta P_{min} = P_1 - m_1 P_{N1}$$

in the calculation formulas, $P_{N1}$ represents a rated power of the VSC-HVDC, $P_1$ represents an actual operating power of the VSC-HVDC, $k_1$ is an overload capacity coefficient of the VSC-HVDC, and $m_1$ is a minimum operating level coefficient of a VSC-HVDC power.

6. The dynamic frequency coordination control method according to claim 1, wherein the LCC-HVDC FLC activation strategy comprises a second power regulation upper limit and a second power regulation lower limit, wherein a calculation formula for the second power regulation upper limit is:

$$\Delta P_{up.max} = k_2 P_{N2} - P_2$$

a calculation formula for the second power regulation lower limit is:

$$\Delta P_{down.min} = P_2 - m_2 P_{N2}$$

in the calculation formulas, $P_{N2}$ represents a rated power of an LCC-HVDC, $P_2$ represents an actual operating power of the LCC-HVDC, $k_2$ is an overload capacity coefficient of the LCC-HVDC, and $m_2$ is a minimum operating level coefficient of an LCC-HVDC power.

7. The dynamic frequency coordination control method according to claim 1, wherein the VSC-HVDC adaptive reactive power support control activation strategy comprises an additional reactive power, and a calculation formula for the additional reactive power is:

$$\Delta Q = \Delta P \tan \varphi$$

in the calculation formula, $\Delta P$ represents a power variation of an LCC-HVDC connected to the VSC-HVDC, and $\varphi$ represents a power factor on a valve side of the LCC-HVDC connected to the VSC-HVDC.

8. The dynamic frequency coordination control method according to claim 1, wherein the grid-following additional frequency control strategy for the grid-connected renewable energy generation comprises an additional frequency control, and a calculation formula for obtaining an additional power from the additional frequency control is:

$$\Delta P_1 = -k_d \frac{df}{dt} - k_p \Delta f$$

in the calculation formula, $k_d$ represents a derivative coefficient, $k_p$ represents a proportional coefficient, and $\Delta f$ represents a difference between a frequency reference value and an actual value at the sending-end renewable energy grid connection point.

9. The dynamic frequency coordination control method according to claim 1, wherein the grid-forming control strategy for the grid-connected renewable energy generation comprises a Droop Control and a Virtual Synchronous Generator (VSG) Control, and an expression for the Droop Control is:

$$\frac{d\omega}{dt} = \frac{1}{Js}\left(D_p\left(\omega_0 - \frac{d\omega}{dt}\right)\right) + (P_0 - P)$$

an expression for the VSG control is:

$$\frac{d\omega}{dt} = \omega_0 + k_L(P_0 - P)$$

in the expressions for the Droop Control and the VSG control, J represents a virtual inertia coefficient, $D_p$ represents a virtual damping coefficient, $\omega$ is an actual angular frequency of the system, $\omega_0$ is a steady-state angular frequency of the system, $P_0$ is a steady-state active power of the system, P is an actual active power of the system, and $k_L$ is a droop coefficient.

10. A power grid system, comprising: a memory, a processor, and an asynchronous regional power grid dynamic frequency coordination control program for wet and dry seasons stored in the memory and executable on the processor, wherein the asynchronous regional power grid dynamic frequency coordination control program, when executed by the processor, implements the steps of the dynamic frequency coordination control method for the asynchronous regional power grids during the wet and dry seasons according to claim 1.

11. The power grid system according to claim 10, wherein in the dynamic frequency coordination control method, after the step S2, when the system is controlled based on the frequency synchronous control in the VSC-HVDC activation strategy, determining whether the first frequency difference exceeds the preset primary frequency regulation dead-band of the renewable energy, and whether the first frequency difference exceeds preset primary frequency regulation dead-band of conventional units;

when the first frequency difference exceeds the preset primary frequency regulation dead-band of the renewable energy and the preset primary frequency regulation dead-band of the conventional units, an execution of the step S3 is allowed;

when the first frequency difference does not exceed the preset primary frequency regulation dead-band of the renewable energy and the preset primary frequency regulation dead-band of the conventional units, return to execute the step S2.

12. The power grid system according to claim 10, wherein in the dynamic frequency coordination control method, after the step S4, when the system is controlled based on the LCC-HVDC FLC activation strategy, determining whether the first frequency difference exceeds the preset primary frequency regulation dead-band of the renewable energy, and whether the first frequency difference exceeds preset primary frequency regulation dead-band of conventional units;

when the first frequency difference exceeds the preset primary frequency regulation dead-band of the renewable energy and the preset primary frequency regulation dead-band of the conventional units, an execution of the step S5 is allowed;

when the first frequency difference does not exceed the preset primary frequency regulation dead-band of the renewable energy and the preset primary frequency regulation dead-band of the conventional units, return to execute the step S4.

13. The power grid system according to claim 10, wherein in the dynamic frequency coordination control method, no dead-band is set for the system under the frequency synchronous control in the VSC-HVDC activation strategy.

14. The power grid system according to claim 10, wherein in the dynamic frequency coordination control method, the frequency synchronous control in the VSC-HVDC activation strategy is configured with a first power regulation upper limit and a first power regulation lower limit, wherein a calculation formula for the first power regulation upper limit is:

$$\Delta P_{max} = k_1 P_{N1} - P_1$$

a calculation formula for the first power regulation lower limit is:

$$\Delta P_{min} = P_1 - m_1 P_{N1}$$

in the calculation formulas, $P_{N1}$ represents a rated power of the VSC-HVDC, $P_1$ represents an actual operating power of the VSC-HVDC, $k_1$ is an overload capacity coefficient of the VSC-HVDC, and $m_1$ is a minimum operating level coefficient of a VSC-HVDC power.

15. The power grid system according to claim 10, wherein in the dynamic frequency coordination control method, the LCC-HVDC FLC activation strategy comprises a second power regulation upper limit and a second power regulation lower limit, wherein a calculation formula for the second power regulation upper limit is:

$$\Delta P_{up.max} = k_2 P_{N2} - P_2$$

a calculation formula for the second power regulation lower limit is:

$$\Delta P_{down.min} = P_2 - m_2 P_{N2}$$

in the calculation formulas, $P_{N2}$ represents a rated power of an LCC-HVDC, $P_2$ represents an actual operating power of the LCC-HVDC, $k_2$ is an overload capacity coefficient of the LCC-HVDC, and $m_2$ is a minimum operating level coefficient of an LCC-HVDC power.

16. The power grid system according to claim 10, wherein in the dynamic frequency coordination control method, the VSC-HVDC adaptive reactive power support control activation strategy comprises an additional reactive power, and a calculation formula for the additional reactive power is:

$$\Delta Q = \Delta P \tan \varphi$$

in the calculation formula, $\Delta P$ represents a power variation of an LCC-HVDC connected to the VSC-HVDC, and $\varphi$ represents a power factor on a valve side of the LCC-HVDC connected to the VSC-HVDC.

17. The power grid system according to claim 10, wherein in the dynamic frequency coordination control method, the grid-following additional frequency control strategy for the grid-connected renewable energy generation comprises an additional frequency control, and a calculation formula for obtaining an additional power from the additional frequency control is:

$$\Delta P_1 = -k_d \frac{df}{dt} - k_p \Delta f$$

in the calculation formula, $k_d$ represents a derivative coefficient, $k_p$ represents a proportional coefficient, and $\Delta f$ represents a difference between a frequency reference value and an actual value at the sending-end renewable energy grid connection point.

* * * * *